United States Patent Office 2,870,126
Patented Jan. 20, 1959

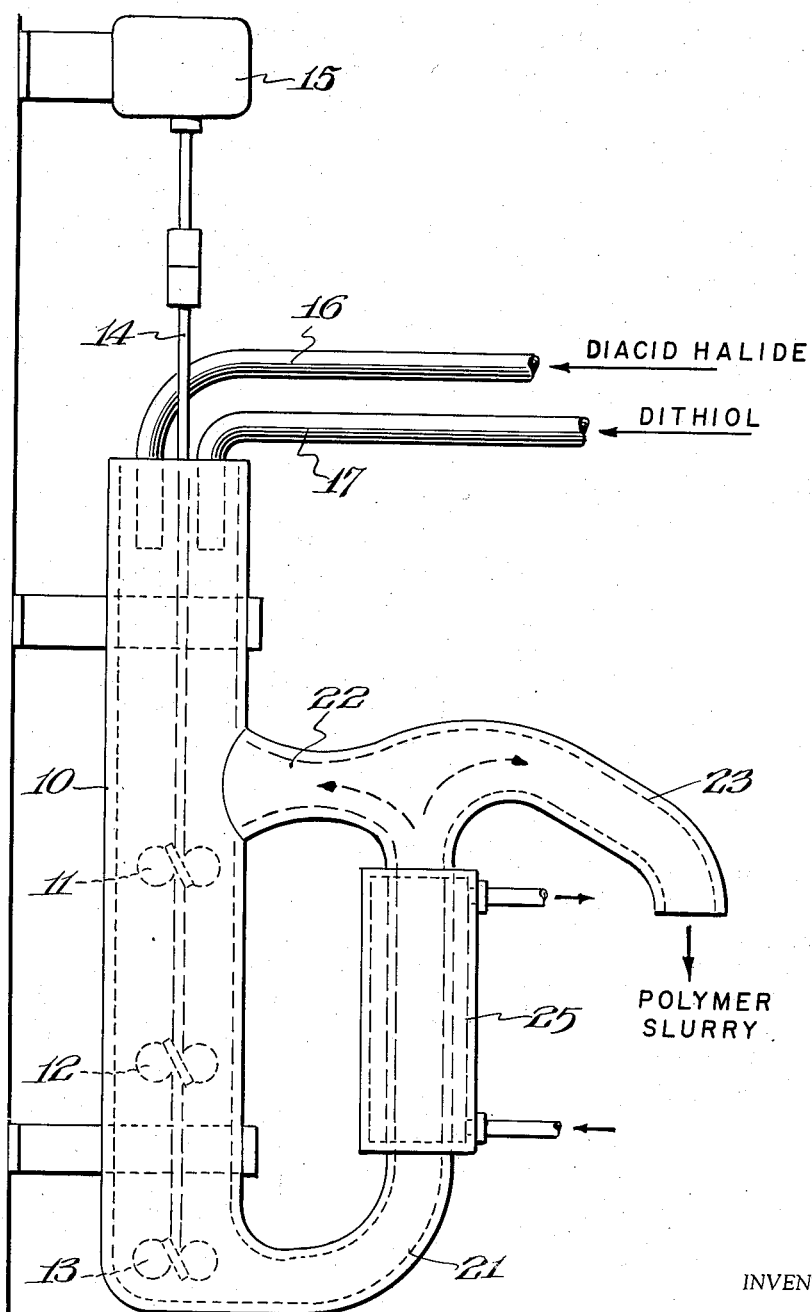

2,870,126

PROCESS FOR PREPARING FIBER-FORMING POLYTHIOLESTERS BY INTERFACIAL CONDENSATION POLYMERIZATION

Wilbur A. Murphey, Camden, S. C., assignor to E. I. du Pont de Nemours and Company, Wilmington, Del., a corporation of Delaware Application July 8, 1953, Serial No. 366,689

9 Claims. (Cl. 260—78.5)

This invention relates to the preparation of polythiolesters from organic dithiols and organic dicarboxylic acid halides and, more particularly, to a process for preparing fiber-forming polythiolesters by a moderate temperature interfacial condensation polymerization.

It is well-known that polyesters may be prepared by reacting, at ester-forming temperatures, organic diols with organic dicarboxylic acids or ester-forming derivatives of these acids such as their esters. Representative patents covering this field include Carothers' U. S. Patents 2,071,250 and 2,071,251, as well as later patents such as 2,465,150 to Dickson and 2,465,319 to Whinfield and Dickson. These patents all disclose that the successful preparation of high molecular weight fiber-forming polyesters is restricted to high temperature reaction in the range of 150° to 300° C. using pure reactants in substantially equivalent proportions. Polythiolesters lend themselves to preparation under similar conditions as disclosed in U. S. Patent 2,510,567 to Flory.

It is an object of this invention to provide a process for producing fiber-forming polythiolesters from organic dithiols at moderate temperatures. It is a further object to provide such a process which has the advantages of using simple equipment and not requiring pure reactants or careful control of proportions. Another object is to provide such a process which is rapid, is readily practiced in continuous fashion, and produces a finely divided product. A still further object is to provide a process suitable for the production of polythiolesters which cannot be prepared at the high temperatures disclosed in the prior art, either because of the instability of the reactants or the instability of the desired polythiolester at elevated temperatures. Other objects will become apparent from the following disclosure and the claims.

It has now been found that organic dithiols react with organic dicarboxylic acid halides smoothly and rapidly to form fiber-forming polythiolesters at moderate temperatures when these reactants are brought together in the presence of an acid acceptor in such a way that the reaction zone is at, or is immediately adjacent to, a liquid-liquid interface and most of the molecules of at least one of the reactants must diffuse through liquid diluent to arrive at the reaction zone. The process for accomplishing this comprises bringing together the dithiol in one liquid phase and the acid halide in a second liquid phase immiscible with the first phase, mixing the liquid phases to form a system comprised of two liquid phases, such that the dithiol and acid acceptor are in one phase and the acid halide is in a separate phase, and at least one of the phases includes a liquid diluent, maintaining the phases in admixture in the presence of the acid acceptor until the desired condensation polymerization has taken place, and then, if desired, separating the resulting fiber-forming polythiolester. Preferably a reactant is a liquid under the reaction conditions or is dissolved in a diluent, but one of the reactants may be a finely divided solid dispersed or suspended in a diluent in which the reactant is at least partially soluble. The organic dicarboxylic acid halide may be a diacid fluoride, a diacid chloride, a diacid bromide, a diacid iodide, or a mixed diacid halide.

The drawing illustrates a suitable apparatus for carrying out the process in continuous fashion.

The above process may be carried out with a large number of variations, not all of which are equally adaptable to the preparation of each specific polythiolester. The broad methods, falling within the purview of this new process and depicted in the examples hereinafter set forth, include the following: (1) non-aqueous systems in which at least one of the reactants is dissolved or dispersed in a diluent or diluents such that at least two liquid phases are obtained upon the initial mixing, and (2) aqueous systems which may contain an acid acceptor and in which the dithiol is dissolved or dispersed in water, or water and another diluent, and in which the diacid halide is undiluted or is dissolved or dispersed in a nonaqueous liquid diluent of such character that on mixing the liquids, a system of two liquid phases is obtained initially. In each instance an acid acceptor must be present either initially or soon after the reactive interface is produced.

It will be seen that the first broad method encompasses such variations as (a) a dithiol dissolved or dispersed in a non-aqueous liquid diluent containing an acid acceptor and reacted with a liquid diacid halide which is substantially insoluble in this non-aqueous diluent, (b) a dithiol dissolved or dispersed in a non-aqueous liquid diluent and reacted in the presence of an acid acceptor with a diacid halide dissolved or dispersed in a non-aqueous liquid diluent such that the two non-aqueous diluents are immiscible, and (c) either a dithiol or a diacid halide dissolved or dispersed in an emulsion of non-aqueous diluents and reacted with the other reactant, which may be diluted with a non-aqueous diluent immiscible with one of the diluents for the first reactant such that the required acid acceptor, either initially or soon after the reactive interface is formed, is contained in the phase which comprises the dithiol.

With respect to broad method number (2), described above, it is seen that the following variations are included therein, (a) a dithiol dissolved or dispersed in water containing an acid acceptor and reacted with a liquid diacid halide, (b) a dithiol dissolved or dispersed in water containing an acid acceptor and reacted with a diacid halide dissolved or dispersed in a non-aqueous liquid diluent which is immiscible with water, and (c) a dithiol dissolved or dispersed in an acid acceptor containing emulsion of water and non-aqueous diluent and reacted with a diacid halide, which may be diluted with a water-immiscible diluent.

For purposes of convenience, the polymerization process delineated in the paragraphs directly above shall hereinafter be called interfacial polymerization. Furthermore, whenever a reactant is said to be "dispersed" in a diluent, in addition to the more usual meaning which encompasses the suspension of small discrete particles of solid or liquid in a diluent, this expression is intended to include cases in which the reactant is dissolved in a diluent, and "dispersion" is intended to include true solutions. While there is a technical difference between dispersions and true solutions, they are often difficult to distinguish and the two are equivalent in the practice of this invention.

It is essential to use an acid acceptor for the hydrogen halide which is liberated in the course of the reaction of the organic dithiol with the organic dicarboxylic acid halide. Preferably the acid acceptor is added initially in the aqueous or other liquid phase containing the dithiol, but it may be added to the reaction vessel separately from the other reactants. When the acid acceptor is added initially with the dithiol a soluble salt of the dithiol is formed if the acceptor is of sufficient basic strength. The acid acceptor may range from an amount equivalent to the dithiol present up to 15 times such amount or even more. Preferably, the added acid acceptor will be in the range of 1 to 3 times the amount equivalent to the dithiol present. The added acid acceptor should be soluble in the phase which contains the dithiol. Depending on the sensitivity of the dibasic acid halide, the added acid acceptor may be a hydroxide of any of the alkali or alkaline earth metals, or other basic metal hydroxide, or a carbonate or other salt of a suitably strong base and a suitably weak acid or a quaternary organic base, but the basic material must not form insoluble salts with the dithiols. These basic materials may be added directly to one of the liquid phases, or sometimes to both the liquid phases, either before or during the course of the reaction. As can be seen in the examples hereinafter set forth, the liquid phase containing the dithiol can be strongly alkaline and still not prevent the preferential reaction of the diacid halide with the dithiol or its salt.

The process for the preparation of polythiolesters by interfacial polymerization can be carried out over a considerable range of temperatures from just above the freezing point of the phase having the highest freezing point up to temperatures at which decomposition products form to an objectionable extent. However, in view of the rapidity with which fiber-forming polythiolesters are formed at moderate temperatures, there is no advantage in using temperatures higher than 150° C. and it is preferred that the reaction be carried out in the moderate temperature range of −10° to +60° C.

It is essential that the solvent or diluent employed for a specific reactant be inert toward it. It is not essential however, that the solvent or diluent used in one phase be completely inert to the reactant in the other phase. Generally speaking, it is essential that the two reactants be more reactive toward each other than either reactant is to the solvent or diluent of the other phase. If this were not the case, the yield of polythiolester would be greatly reduced, or might even be non-existent.

Since the reaction rate of dithiols with diacid halides is rapid at room temperature, it is preferable that the addition of the two phases containing the separate reactants be accompanied by sufficiently rapid stirring to produce an emulsion of fine particle size. Such emulsions may be equally well produced by other means, for example, by impinging two high velocity liquid streams upon each other in a suitable manner. When an emulsion of fine particle size is provided the available dithiol and/or the diacid halide is completely used up in a matter of a few seconds or, at most in a matter of a few minutes, depending to an extent on the sum total of the reaction conditions.

Fibers are prepared from polythiolesters by spinning from a melt. The temperatures commonly employed for the production of the most useful melt-spun fibers are in the neighborhood of 200° to 300° C., and this may cause a further polyesterification reaction because the polymer chain still contains terminal ester-forming groups. When this occurs the molecular weight and melt viscosity both increase. Such changes in viscosity and molecular weight may constitute a serious problem in the preparation of uniform filaments. This can be overcome by treating the unstabilized polythiolester with a mono-functional reactant, such as a mono-thiol or a mono acid halide, and thus block off the remaining ester-forming end-groups to form a stabilized polymer. An alternative method is to employ a mono-functional thiol or a monofunctional acid chloride as a stabilizer in the polythiolester forming reaction of this invention. Small amounts of these mono-functional reactants, for example, from 0.1 to 5 mole percent, will enter into the reaction during the formation of polythiolester chains and serve as non-reactive end groups for these chains. Consequently, when such a polymer is subsequently heated for the purposes of melt spinning, neither the molecular weight nor the viscosity will increase, since there are no ester-forming terminal groups in the polythiolester. Thus a melt-stable polythiolester is obtained which has considerably more utility than the unstabilized material for this particular use.

Surprisingly, contrary to the teachings of the prior art, relatively impure reactants may be employed in the process of this invention. For example, dicarboxylic acids frequently constitute major impurities in diacid halides. These dicarboxylic acids do not react under the conditions employed for the process of this invention and consequently do not enter into the polythiolester formation. Instead they remain in the spent reaction liquor and are easily separated from the solid precipitated polythiolester. Likewise it has been found that the dithiol may be grossly contaminated with a dithiol acetate, an impurity which is difficult to remove. All manner of impurities which are non-reactive with either of the reactants under the conditions of this polymerization may be present without affecting the constitution or the purity of the resultant polythiolester. Those impurities will not be a part of the polythiolesters produced and will either remain in the spent reaction liquor or should they be insoluble in the diluents employed, they can be readily leached from the polythiolester by simply percolating an appropriate solvent through a bed of the collected polythiolester. If any impurity is valuable as a starting material for the preparation of a reactant, it can be recovered from the spent liquor and then be converted to the reactant for use in the process. In this way the efficiency of the over-all reaction can be improved for impure reactants and the cost of the final product correspondingly reduced. Mono-functional reactants of the type described above which serve as stabilizers are of course not to be considered among the classes of impurities which can be tolerated in large amounts.

Another surprising feature of this invention which is contrary to the teachings of the prior art is that the reactants do not need to be employed in equivalent proportions. The excess of one reactant simply remains in the supernatant liquid from which the polythiolesters are precipitated. It has been found that the process of interfacial polymerization of dithiols with diacid halides yields polythiolesters of high molecular weight whether one reactant is in excess by 300% or even more, or whether the reactants are in equivalent or nearly equivalent amounts. For purposes of economy, it is usually desirable to employ the reactants in equivalent or nearly equivalent amounts.

The concentration of the reactants in the separate liquid phases can vary over wide limits and still produce high molecular weight polythiolesters. As shown in the examples, either reactant, but not both, may be employed in 100% concentration as the pure compound. Likewise, either reactant may be employed in a very low concentration in its separate liquid phase, for example, concentrations as low as 0.1% or even lower are useful.

It is sometimes advantageous to employ an emulsifying agent to assist in suspending one liquid phase in the other. To this end, water or organic soluble emulsifying agents may be used. Examples of organic soluble agents are the "Spans" (sorbitan mono fatty acid esters), the higher fatty alcohols, the higher fatty alcohol esters, "Naccolene F" (alkyl aryl sulfonate) "Acto 700" (sodium petroleum sulfonate), "Alkaterge C" (substituted oxazoline), "Betanols" (high molecular weight esters) "Duponol OS" (higher alcohol derivative) etc.

Where one phase is aqueous, the emulsifying agents may be cationic, anionic or non-anionic. Representative examples of cationic emulsifying agents are "Lorol" pyridinium chloride (mixture of aliphatic alcohols obtained by hydrogenation of coconut oil), "Triton K–60" (cetyl dimethyl benzyl ammonium chloride) "Nopcogen 17L"

(a hydroxylated polyamide). Representative examples of non-ionic agents are the "Tweens," (polyoxyethylene derivatives of sorbitan monoesters of long-chain fatty acids) "Triton N-100" (alkylated aryl polyether alcohol), the "Elvanols" (partially hydrolyzed polyvinyl acetates of various molecular weights), etc. and representative examples of the anionic emulsifying agents are soaps, the amine salts, "Duponol ME" (sodium lauryl sulfate), "Aerosol OT" (dioctyl ester of sodium sulfosuccinic acid), "Aresklene 400" (dibutyl phenol sodium disulfonate) "MP-189" (hydrocarbon sulfonate), etc.

It is sometimes desirable to load the solvent for the respective reactants with non-reactive solutes so as to produce, for example, a better yield, or a higher molecular weight, or a more useful polythiolester. Such non-reactive substances may be salts such as sodium chloride, potassium bromide, lithium sulfate and the like for loading the aqueous phase.

Copolythiolesters are prepared by substantially the same procedure as homopolythiolesters by the process of this invention. Where the reactants are one dithiol and one diacid halide, a homopolythiolester results. Where the reactants are two or more dithiols and one diacid halide or two or more diacid halides and one dithiol or two or more diacid halides and two or more dithiols, copolythiolesters are produced having compositions which depend on the ratios and reactivities of the reactants.

The following examples illustrate preferred methods of practicing the invention and the effect of variations of operating conditions on the products obtained and the yields, but are not to be construed as limiting the scope of the invention. In these examples the inherent viscosity values of the products are given as an indication of the degree of polymerization obtained. In view of the relative ease with which these values are determined, they provide a useful method of evaluating the effect of process variables on a given type of polymerization. The values may be misleading when used to compare different types of polythiolesters but, in general, those having values of at least about 0.3 were spinnable. In determining these values, viscosimeter flow times were obtained at $25.0° \pm 0.1°$ C. for a solvent for the polythiolester and also for a solution of the polythiolester in the solvent at a concentration of 0.5 gram per 100 cubic centimeters of solution. The inherent viscosity value was then calculated as 2 times the natural logarithm of the relative viscosity of the solution compared to that of the pure solvent.

*Example 1*

The apparatus shown in the drawing was used for continuous preparation of polypentamethylene thioisophthalate by the process of this invention. This apparatus comprised a 1500 cc. glass reaction vessel 10 provided with an agitator comprising three-bladed propellors 11, 12 and 13 mounted on shaft 14 driven by motor 15. These propellors were located near the top, middle and bottom, respectively, of the vessel. The reactants were added in separate solutions at the top of the vessel directly above propellor 11 through pipes 16 and 17. A slurry of polymer and liquid was withdrawn from the bottom of the vessel through pipe 21, and part of the slurry was recirculated to the top of vessel 10 through pipe 22. The remainder of the slurry was withdrawn through overflow pipe 23 and filtered to recover the polymer. The slurry was cooled during passage through pipe 21, by cooling jacket 25.

A continuous stream of isophthaloyl chloride solution in benzene was supplied through pipe 16 and a continuous stream of pentamethylenedithiol solution in aqueous alkali was supplied through pipe 17. The isophthaloyl chloride solution was 10% by weight in benzene and was introduced at the rate of 265 cc. per minute. The pentamethylenedithiol solution which was 1.3% by weight in water, and which contained 0.74% by weight of sodium hydroxide, was introduced at the rate of 1300 cc. per minute. The agitator was rotated at a rate sufficiently rapid to produce good mixing between the two entering streams of reactants and to provide adequate recirculation in the circular path of the reaction vessel, as well as to keep the precipitated polythiolester in suspension so as to be carried off at the overflow. The solid white polypentamethylene thioisophthalate was collected at the outlet at the rate of 1600 g. per hour, and was separated from the supernatant liquid by filtration, washed with water, with methanol and dried to yield a polymer having an inherent viscosity in m-cresol of 0.7.

This polymer was melt-spun from a melt pool at 210° C. into a 5-filament yarn of 115 denier. This yarn was hot drawn 230% at 75° C. to give a strong uniform yarn of 50 denier. The yarn properties were 1.6 g. per denier and 12% break elongation. The initial modulus was 29 g. per denier.

*Example 2*

In a 1 liter flask equipped with a high speed stirrer was placed 150 g. water, 4.7 g. ethanedithiol (0.05 mol), 1 g. "Duponol ME" and 4.2 g. NaOH. The aqueous phase was cooled to 5° C. and a solution of 10.1 g. terephthaloyl chloride (0.05 mol) in 150 ml. benzene was added, all at once, with vigorous agitation. A white solid polymer precipitated at once and the temperature rose to about 15° C. over the period of the 10 minutes stirring. The resulting precipitate of polydimethylene thiolterephthalate was filtered off, washed three times with water and twice with acetone and then dried to give 11.8 g. of product. This polymer had a sticking temperature of 340° C. and was insoluble in any of the following solvents: 10% aqueous potassium hydroxide, dimethyl formamide, tetrachloroethane-phenol (40–60 by wt.) m-cresol, chloroform, benzene, trichlorophenol-phenol (40–60 by wt.).

*Example 3*

In a 1 liter flask equipped with a high speed stirrer 300 g. water, 1 g. "MP 189" hydrocarbon sulfonate emulsifying agent, 250 ml. benzene, 2.15 g. sodium hydroxide (0.054 mol) and 4.0 g. hexamethylenedithiol (0.0263 mol) were mixed to form an emulsion. To this mixture under vigorous agitation was added over a period of 1 minute 5.1 g. terephthaloyl chloride (0.025 mol) in 50 ml. benzene. The temperature, before the addition of the acid chloride, was 30° C., and after the addition, it was found to have risen to 55° C. After completion of the addition of the acid chloride, the mixture of the precipitated polythiolester and the residual solution was stirred for another 30 minutes as a matter of convenience before being filtered. The solid polyhexamethylene thiolterephthalate was washed three times with water, twice with acetone and was then dried. The polymer had an inherent viscosity of 0.41 in a solvent composed of 40 parts by weight tetrachloroethane and 60 parts by weight phenol. 100% yield of product was achieved. The polymer had a sticking temperature of 225° C. and melted at 260 to 270° C. It could be melt spun into silk-like fibers.

*Example 4*

In a Waring blendor with vigorous agitation were placed 250 ml. cyclohexane, 300 g. water, 1 g. "MP-189," 2.15 g. sodium hydroxide and 2.5 g. ethanedithiol (0.0263 mol). The temperature of this emulsion was 30° C. before adding the solution of 5.1 g. isophthaloyl chloride (0.025 mol) in a mixed solvent consisting of 10 ml. benzene and 40 ml. cyclohexane. After the addition of the acid chloride solution over a period of 30 seconds the temperature had risen to 50° C. and the polyethylene thiolisophthalate came out as a white solid after stirring for 30 minutes as a matter of convenience. The resulting precipitate of solid white polymer was filtered off, washed with water, washed with acetone and dried. The yield was 4.3 g. and the polymer gave an inherent viscosity of 0.35 in the same solvent used in Example 3. Its sticking temperature was 185° C.

*Example 5*

Into a Waring blendor at room temperature was placed 2.5 g. of pentamethylenedithiol, 200 g. water and 1.47 g. sodium hydroxide and 100 ml. carbon tetrachloride. Under vigorous agitation was added over a period of 2 minutes 3.74 g. isophthaloyl chloride in 40 ml. carbon tetrachloride. The polypentamethylene thiolisophthalate precipitated at once as a white solid, which, after 10 minutes additional stirring as a matter of convenience, was filtered off, washed twice with water, twice with methanol and dried. The yield was 78% and the polymer gave an inherent viscosity in m-cresol of 0.57. The polymer sticking temperature was 175° C.

*Example 6*

Into a 1 liter flask equipped with a high speed stirrer was put 100 g. water and 5 g. 1,4-butanedithiol. Vigorous agitation produced a dispersion of the dithiol in the water. Next was added simultaneously at room temperature while maintaining the vigorous agitation a separate solution of 10 g. adipyl chloride in 100 g. hexane and a separate solution of 5 g. sodium hydroxide in 100 g. water. The two solutions were added drop-wise over a period of twenty minutes while maintaining the temperature at 25° C. The polytetramethylene thioladipate precipitated as a white solid having a melting point of approximately 100° C. The inherent viscosity in meta-cresol was 0.5.

*Example 7*

Into a Waring blendor at room temperature was placed 4.7 g. of 1,2-ethanedithiol, 100 g. of acetone and 25 g. trimethyl benzyl ammonium t-butoxide. To this solution under agitation was added slowly a solution of 12 g. sebacyl chloride in 200 g. kerosene. The resulting precipitate of solid polymer was filtered off, washed with n-heptane and with acetone and dried to give a yield of 9 g. The polymer had an inherent viscosity in m-cresol of 0.4.

*Example 8*

4.7 g. 1,2-ethanedithiol and 4.0 g. sodium hydroxide were dissolved in 300 g. water in a Waring blendor. To this solution under vigorous agitation was added drop-wise 9.15 g. adipyl chloride. The resulting polydimethylene thioladipate after washing with water and drying had a melting point of 125° C. The yield was 8.1 g. and the polymer gave an inherent viscosity of 0.5 in m-cresol as a solvent.

Any organic diacid halide may be used in the process of this invention. This includes the acid fluorides, chlorides, bromides and iodides of aliphatic, aromatic and cycloaliphatic acids and includes sulfonyl halides and the like as well as carbonyl halides. Illustrative of some of the commercially more desirable halides which may replace those in the examples are metabenzenedisulfonyl chloride, ethylene bischloroformate, hexane-1,6-disulfonyl chloride, succinyl chloride, phthaloyl chloride, 1,5-naphthalenedisulfonyl chloride, hexahydroterephthaloyl chloride, phosgene, etc. The most desirable results are obtained with hydrocarbon dicarboxylic acid chlorides of 4 to 10 carbon atoms, as illustrated by the examples.

The dithiols which may be used in the process of this invention include the primary, secondary and tertiary dithiols of aliphatic, araliphatic, cycloaliphatic and aromatic hydrocarbons. Illustrative of some of the more desirable dithiols which may replace those in the examples are decamethylenedithiol, 1,3-benzenedithiol, 1,5-naphthalenedithiol, p-xylylenedithiol, 1,4-benzenedithiol, 2,6-naphthalenedithiol, 1,4-cyclohexanedithiol, etc. The most desirable results are obtained with hydrocarbon dithiols of 2 to 10 carbon atoms, as illustrated by the examples.

The advantages of the interphase polymerization process for polythiolesters over the methods previously described in the prior art are many and varied. By the method of this invention, polythiolesters which decompose at temperatures below their melting points may be easily and simply prepared with essentially no degradation products. Likewise, those polythiolesters which are normally prepared from reactants that decompose at the temperature normally employed may be produced simply and easily by the process of this invention. It is further seen that complicated or high strength equipment is not necessary for the process of this invention since the reaction is carried out preferably in the range including room temperature under atmospheric pressure. Additional advantages for this invention are that it is not necessary to employ high purity reactants to obtain a satisfactorily pure and high molecular weight polyamide and it is not necessary to maintain an exact equivalence of the reactants in the reacting mixture.

Importantly, the process of this invention for the production of polythiolesters yields the final product in an extremely short period of time after the reaction is initiated. As a result an enormous productivity can be achieved from relatively simple equipment occupying only a relatively small amount of floor space. Still another advantage is that the polythiolesters of this invention are obtained in a finely divided or granular state, which is easily dissolved for the purposes of wet spinning or dry spinning, and which is readily melted for the melt-spinning process disclosed for the polythiolesters or similar polymers of the prior art. A still further advantage lies in the fact that the polythiolesters produced by the process of this invention are odorless in contrast to those made according to Flory, U. S. Patent No. 2,510,567.

Another and important advantage of this invention is that it can be practiced in a continuous fashion. The streams of the two reactant liquids can be brought together as described in Example 1, or the same end can be accomplished in many other ways; for example, the streams of the two liquid reactants may be made to impinge upon each other at a high velocity so as to form an emulsion of fine droplet size. This emulsion need exist only for the very short time in which the reaction takes place. The resulting polythiolester may then be separated from the spent reaction liquors. The advantages attributable to continuous processes are well appreciated in the chemical field.

Another important advantage of the invention is that polythiolester dispersions can be prepared directly from the reactants. The dispersions can be used as prepared in the stable dispersed state in coating applications, or the dispersions can be broken when desired.

The polythiolesters produced by the process of this invention have utility in many and varied fields. They may serve as ingredients of coating compositions, they may be molded into useful plastic articles, they may be used for the production of fibers, filaments and films, and in general, they possess all the utility of the polythiolesters or like polymers prepared by the methods of the prior art.

As many different embodiments of the present invention may be made without departing from the spirit and scope thereof, it is to be understood that the invention is not limited to the specific embodiments disclosed except to the extent defined in the appended claims.

What is claimed is:

1. A process for preparing fiber-forming polythiolesters which comprises mixing at −10° to +60° C. a water-immiscible phase containing a diacyl halide of a dicarboxylic acid with an aqueous solution of a salt from an organic dithiol and at least an equivalent amount of an acid acceptor, and continuing the mixing with suitable agitation to produce an emulsion of fine particle size until an interphase condensation polymerization has taken place with formation of finely divided polythiolester suitable for spinning into fibers without further polymerization.

2. A process for preparing fiber-forming polythiolesters which comprises mixing at −10° to +60° C. a water-immiscible phase containing a hydrocarbon dicarboxylic acid halide of the general formula

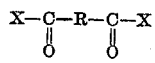

wherein X is a halogen and R is a divalent radical of the group consisting of alkylene radicals of 2 to 8 carbon atoms and phenylene and wherein the carbonyl groups are attached to separate carbon atoms, with a second liquid phase immiscible with the first phase and comprising an aqueous solution of a soluble salt from a hydrocarbon dithiol of the general formula

wherein $n$ is an integer from 2 to 10, and from 1 to 15 times an equivalent amount of an alkali acid acceptor and continuing the mixing with suitable agitation to produce an emulsion of fine particle size until an interphase condensation polymerization has taken place with formation of finely divided polythiolester suitable for spinning into fibers without further ploymerization.

3. A process as defined in claim 2 wherein the acid halide is a phthaloyl dichloride.

4. A process as defined in claim 2 wherein the acid acceptor is present in the range of 1 to 3 times the amount equivalent to the dithiol present.

5. A process for preparing a fiber-forming polythiolester which comprises mixing at −10° to +60° C. a water-immiscible phase containing a phthaloyl dichloride with an aqueous solution of a salt from pentamethylenedithiol and an alkali acid acceptor at least equivalent to the dithiol, and continuing the mixing with suitable agitation to produce an emulsion of fine particle size until an interphase condensation polymerization has taken place with formation of finely divided polythiolester suitable for spinning into fibers without further polymerization.

6. A process for preparing a fiber-forming polythiolester which comprises mixing at −10 to +60° C. a water-immiscible phase containg a phthaloyl dichloride with an aqueous solution of a salt from 1,2-ethanedithiol and an alkali acid acceptor at least equivalent to the dithiol, and continuing the mixing with suitable agitation to produce an emulsion of fine particle size until an interphase condensation polymerization has taken place with formation of finely divided polythiolester suitable for spinning into fibers without further polymerization.

7. A process for preparing a fiber-forming polythiolester which comprises mixing at −10° to +60° C. a water-immiscible phase containing a phthaloyl dichloride with an aqueous solution of a salt from hexamethylenedithiol and an alkali acid acceptor at least equivalent to the dithiol, and continuing the mixing with suitable agitation to produce an emulsion of fine particle size until an interphase condensation polymerization has taken place with formation of finely divided polythiolester suitable for spinning into fibers without further polymerization.

8. A process for preparing a fiber-forming polythiolester which comprises mixing at −10° to +60° C. a water-immiscible phase containing adiphyl chloride with an aqueous solution of salt from 1,4-butanedithiol and an alkali acid acceptor at least equivalent to the dithiol, and continuing the mixing with suitable agitation to produce an emulsion of fine particle size until an interphase condensation polymerization has taken place with formation of finely divided polythiolester suitable for spinning into fibers without further polymerization.

9. A process for preparing a fiber-forming polythiolester which comprises mixing at −10° to +60° C. a water-immiscible phase containing adipyl chloride with an aqueous solution of a salt from 1,2-ethanedithiol and an alkali acid acceptor at least equivalent to the dithiol, and continuing the mixing with suitable agitation to produce an emulsion of fine particle size until an interphase condensation polymerization has taken place with formation of finely divided polythiolester suitable for spinning into fibers without further polymerization.

References Cited in the file of this patent

UNITED STATES PATENTS

| | | |
|---|---|---|
| 2,510,567 | Flory | June 6, 1950 |
| 2,660,575 | Jones et al. | Nov. 24, 1953 |
| 2,667,468 | Jones | Jan. 26, 1954 |
| 2,708,617 | Magat et al. | May 17, 1955 |

FOREIGN PATENTS

| | | |
|---|---|---|
| 892,361 | France | Jan. 7, 1944 |
| 895,395 | France | Apr. 3, 1944 |
| 53,325 | France | Jan. 22, 1945 |
| | (1st. addition to 892,361) | |